US008181993B2

(12) United States Patent
Erdmann et al.

(10) Patent No.: US 8,181,993 B2
(45) Date of Patent: May 22, 2012

(54) ID CARD COMPRISING A CONTOURED RELIEF STRUCTURE, AND CORRESPONDING PRODUCTION METHOD

(75) Inventors: Markus Erdmann, München (DE); Günter Endres, München (DE)

(73) Assignee: Giesecke & Devrient GmbH, Munich (DE)

( * ) Notice: Subject to any disclaimer, the term of this patent is extended or adjusted under 35 U.S.C. 154(b) by 401 days.

(21) Appl. No.: 12/297,166

(22) PCT Filed: Apr. 11, 2007

(86) PCT No.: PCT/EP2007/003219

§ 371 (c)(1), (2), (4) Date: Jan. 26, 2009

(87) PCT Pub. No.: WO2007/118654

PCT Pub. Date: Oct. 25, 2007

(65) Prior Publication Data

US 2009/0134618 A1 May 28, 2009

(30) Foreign Application Priority Data

Apr. 13, 2006 (DE) ........................ 10 2006 017 159
Nov. 27, 2006 (DE) ........................ 10 2006 055 787

(51) Int. Cl.
*G09C 3/00* (2006.01)

(52) U.S. Cl. ........................................ 283/75; 283/904

(58) Field of Classification Search .................... 283/75, 283/70, 904; 428/158, 310.5, 318.6, 318.8
See application file for complete search history.

(56) References Cited

U.S. PATENT DOCUMENTS

| | | | | |
|---|---|---|---|---|
| 3,949,028 | A | 4/1976 | Murakami et al. | |
| 4,113,487 | A | 9/1978 | Matsunaga et al. | |
| 4,268,615 | A | 5/1981 | Yonezawa | |
| 4,507,346 | A | 3/1985 | Maurer et al. | |
| 4,597,592 | A | 7/1986 | Maurer et al. | |
| 4,597,593 | A | 7/1986 | Maurer | |
| 4,672,891 | A * | 6/1987 | Maurer et al. | 101/32 |
| 5,005,872 | A | 4/1991 | Lass et al. | |
| 5,298,922 | A * | 3/1994 | Merkle et al. | 347/232 |
| 6,022,905 | A * | 2/2000 | Harris et al. | 522/2 |
| 6,127,475 | A * | 10/2000 | Vollenberg et al. | 524/495 |
| 2004/0001604 | A1* | 1/2004 | Amidror | 382/100 |
| 2006/0145468 | A1* | 7/2006 | Plaschka et al. | 283/72 |

FOREIGN PATENT DOCUMENTS

| | | | |
|---|---|---|---|
| DE | 24 50 948 | A1 | 5/1976 |
| DE | 26 50 216 | A1 | 5/1977 |
| DE | 29 21 011 | B2 | 7/1980 |
| DE | 32 13 315 | A1 | 10/1983 |
| DE | 30 30 450 | C2 | 11/1987 |
| EP | 0 123 163 | A2 | 10/1984 |
| EP | 0 113 131 | B1 | 2/1988 |
| EP | 0 308 904 | B1 | 6/1992 |
| EP | 0 469 982 | B1 | 10/1996 |
| GB | 2 057 363 | A | 4/1981 |

* cited by examiner

*Primary Examiner* — Joanne Silbermann
*Assistant Examiner* — Kristina Junge
(74) *Attorney, Agent, or Firm* — Bacon & Thomas, PLLC

(57) ABSTRACT

An identification card of plastic, for example PVC or polyester, is introduced, in which tactile symbols in the form of foamed relief structures are clearly visually perceivable. The symbols are outlined by a contour achieved by discoloration of the plastic.

14 Claims, 3 Drawing Sheets

ID CARD COMPRISING A CONTOURED RELIEF STRUCTURE, AND CORRESPONDING PRODUCTION METHOD

FIELD OF THE INVENTION

The invention relates to an identification card in which symbols such as for example alphanumerical characters, patterns, images or the like, are designed in a relief-like structure, as well as a method for producing an identification card with a relief structure.

BACKGROUND

Identification cards are used in many areas. For example they are used as credit cards, bank cards, bank payment cards and the like in cashless payment transactions. Provided with corresponding identification features they can also be used as cards identifying their owner. As a consequence of their being widespread, they represent typical mass articles on the one hand, meaning that their production has to be simple and cost-effective, but on the other hand they have to be designed in such a fashion that they are protected against forgery and falsification to the greatest possible extent. In addition the data stored on them should be recognizable in a simple and secure fashion by both machines and people.

Identification cards are known in which information is embossed in the card in the form of relief-like characters. The relief-like characters can on the one hand be palpated by people, and on the other hand they can also serve as printing plate for transferring the information from the card onto paper.

From EP 308 904 it is known to provide a card, which can consist of PVC among other things, with surface features in different manners by differently guided laser processing. It is described in detail how foamed embossed characters are integrated in surface plateaus, planar characters are applied on a card surface by discoloration, and visually verifiable authenticity features are applied on a card surface. By using a two-layer card-surface material whose cover layer is transparent it is also possible to effect foaming and discoloration simultaneously. However, the production of such two-layer card surfaces increases the overall card production effort.

From GB 2 057 363 A and EP 0 469 982 B1 further proposals are known to produce relief structures in plastic which differ in color from the contour. According to GB 2 057 363 A a special plastic material based on a flocked foam is used, according to EP 0 469 982 B1 the foaming of a cast plastic material is to automatically yield a change in the shade of color. The first solution is too elaborate for identification cards, the second yields only small differences in color that are hard to control.

From DE 3 213 315 A1 it is known to produce tactile characters by foaming card material by means of a laser. An identification card therein consists of a plastic material or is provided with a surface layer of a plastic material which is mixed with chemical or physical propellants. The plastic layer is heated and foamed by means of a laser beam. The locally foamed areas form a relief structure on the card surface.

From EP 1 113 131 A2 it is known to produce tactile characters by embossing and to blacken the raised embossings subsequently by means of a laser. Therein the blackening can be carried out in particular exactly on the raised areas, so that a positive writing is created, or can be carried out in between, so that a negative writing is created. Due to the blackening the relief-like, embossed tactile characters are also easily visually perceivable.

The attempt to use both above-mentioned methods for producing identification cards resulted in the finding that characters in a relief structure that were foamed by means of a laser cannot easily be blackened by means of a laser in a subsequent step, or that areas of an identification card which were blackened by means of a laser lose their blackening at least partly during the subsequent foaming. So far nobody has succeeded in producing blackened characters by means of laser treatment on an inexpensive, white standard plastic material, such as for example polyester or PVC. Such characters could be produced only by preparing the surface of the identification card in a special fashion beforehand, for example by adding carbon. However, such a preparation increases the material costs and interferes with the visual appearance of the identification card, since a gray film forms on its surface. It was furthermore found that adding carbon changes the physical properties of the card material, which can make an elaborate test and acceptance procedure necessary.

It is therefore the object of the present invention to propose an identification card with a relief structure of foamed plastic and a method for its production, in which the relief structure is easily visually perceivable.

SUMMARY

The aforementioned problem is solved by an identification card and by a method for producing an identification card having the features of the embodiments described herein.

An identification card according to an embodiment described herein has a card surface with a relief structure of foamed plastic. The relief structure can render tactile symbols in the shape of alphanumerical characters, patterns, images or other graphic structure.

The identification card can consist entirely of one plastic material, which can be foamed locally by applying energy, for example by irradiation with a laser beam. The foamable plastic material can for example be mixed with chemical or physical propellants. Suitable plastics are for example listed in DE publication print 24 50 948, DE laid-open print 26 50 216, DE laid-open print 29 21 011 and DE publication print 3 213 315.

Alternatively the identification card can have a layer of foamable plastic on only one card surface, applied on the whole surface or merely locally.

The inventive identification card is characterized in that the relief structure forming the symbols is outlined by a contour of discolored plastic. In other words, adjoining the relief structure there is an area of discolored plastic in a non-foamed, planar area of the card surface.

Herein the terms “discoloration” or “discolored plastic” designate that the card surface is specifically discolored, in particular darkened, in comparison to surrounding, untreated areas of the card surface by suitable treatment, for example by irradiation with a laser.

The “discolored” areas can be black, or they can merely have a different color or gray shading than the untreated areas.

The contour of discolored plastic can directly adjoin the relief structure. Alternatively between the relief structure and the contour of discolored plastic there can be a narrow area of non-discolored, non-foamed plastic.

Since the relief structure of foamed plastic does not need to be discolored itself, but a contour of discolored plastic is provided only in a non-foamed area of the card surface, the problem of having to discolor foamed plastic can be avoided. The contour of discolored plastic renders the relief structure, which is preferably not discolored itself, easily visually perceivable. Consequently, an identification card is provided in which a relief structure is easily perceivable both tactilely and visually.

The relief structure needs to be outlined only partly by the contour of discolored plastic. For improved visual perceptibility it is already sufficient to have every relief structure area outlined by the discolored contour on only one of its sides. This yields the visual perception of a shadow in oblique lighting.

However, the contour preferably surrounds the relief structure entirely. This means that every self-contained relief structure area, for example every character or every number, is surrounded completely by the contour. In this way a very good visual perceptibility from different perspectives is ensured.

Preferably the contour has a uniform width. In the case of relief structures of a dimension of some few millimeters, as is usual in identification cards, for example a contour can be formed by a line surrounding the relief structure, which line has a uniform width of some few hundred micrometers. The uniform width of the contour results in a consistent, easily perceivable outer appearance of the contour that is pleasant for the viewer.

The card surface can consist of one single plastic material which may be given both in a foamed state and in a discolored state. The state adopted by the plastic material depends on the processing of the plastic material, as described below. As plastic material inexpensive and easily processable materials such as PVC or polyester, ABS or mixtures thereof come into question. In addition also comparatively expensive materials such as polycarbonate or mixtures of expensive and inexpensive materials, such as polycarbonate with PET/PETG, can b used.

The inventive method for producing an identification card assumes that the identification card has a plastic material which can on the one hand be foamed by applying energy, i.e. which increases its volume, and which can on the other hand change its color when energy is supplied in a different fashion, so that for example a blackening of the plastic material is brought about.

The inventive method is in particular suitable to produce the inventive identification card and to implement its above-described optional features.

The inventive method comprises two steps: On the surface of the identification card a foamed relief structure is created by applying energy to the areas to be foamed in a first fashion in a first energy application mode; discolored contours are produced around the areas to be foamed by applying energy in a second fashion in a second energy application mode.

The energy is supplied preferably by irradiation with a laser beam. The laser emitting the laser beam can be operated expediently in different ways and with different output settings in order to enable different energy application modes. Expediently the laser can operate in particular (quasi-) continuously (c.w. operation) or in a pulsed fashion. The energy supplied by the laser each time can furthermore be influenced by adapting the power of the laser beam, the wavelength and the frequency of the laser light, the resting duration of the laser beam on one surface area of the identification card to be treated and/or the focus of the laser beam.

The steps of producing the foamed relief structure and of producing the discolored contours can be carried out in any desired order. For example the relief structure can be foamed first and the discolored contours surrounding the relief structure can be produced subsequently. Alternatively the discolored contours can be produced first and then the relief structure can be foamed within the areas outlined by the contours.

Preferably the areas to be foamed or the already foamed relief structure are not irradiated by the laser beam during the production of the discolored contours. Therein the contours can be implemented as continuous contour lines of uniform width surrounding the foamed areas. By preventing the laser beam for producing the discolored contours from irradiating also the foamed areas, it can be avoided that the discolored contours have an irregular, frayed border in the transition area to the foamed areas, which interferes with the visual appearance of the contours.

Such a frayed border can result from an alternative embodiment of the inventive method, in which for producing the discolored contours a laser beam is guided across both the foamed areas and adjacent areas to be discolored. The laser beam can have a width that is greater than the width of the foamed areas, so that the laser beam exceeds the foamed areas and discolored contours can be produced on both sides of the foamed areas. In this embodiment the discolored contours directly come up to the foamed relief structure. Since the latter cannot be discolored or a previously existing discoloration disappears at least partly when the plastic is foamed, the discolored contours have a border that corresponds to the inverse border of the relief structure. Experience shows that the latter is irregular or frayed due to the foam structure.

Preferably the laser for producing the foamed relief structure is vector-controlled, and the laser irradiation is applied quasi-continuously. To produce the discolored contour the laser energy is expediently applied in a controlled rastered, point-by-point fashion, by operating the laser in a pulsed mode. To produce the relief structure a suitable guidance of the path of the laser can be provided within the framework of the vector control. For example to yield a controlled, modeled energy application the laser beam may be guided along the lines of a grid, within the framework of which the laser beam is guided across the crossing points of the grid several times. Alternatively both the foamed relief structure and the discolored contour can be applied in a controlled raster-mode operation, wherein the laser parameters are changed between the two processing steps.

The two processing steps of producing the discolored contour and producing the foamed relief structure can expediently be carried out in one single processing station, wherein the laser can be guided across the card twice with correspondingly different settings. A great advantage of this embodiment is that the difficult positioning of the card has to take place only once.

The inventive method can be carried out using inexpensive, easy to process plastic material, such as for example PVC or polyester, in particular in the form of PET or PETG. The person skilled in the art knows how to apply the energy on the plastic, for example how the laser has to be adapted regarding its power, its wavelength and/or its operation mode, in order to yield a foaming of the plastic material in the one case and a discoloration of the plastic material in the other case.

BRIEF DESCRIPTION OF THE DRAWINGS

The invention will hereinafter be described by way of example with reference to the accompanying drawings. The figures are described as follows.

DETAILED DESCRIPTION OF VARIOUS EMBODIMENTS

Figure 1:
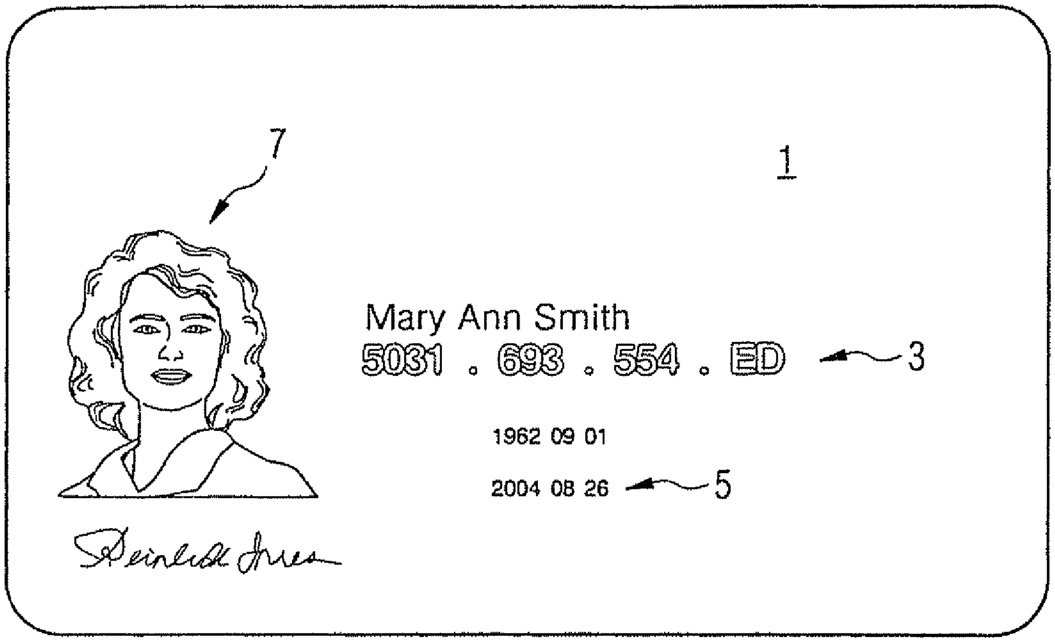
FIG. 1 an identification card implemented in accordance with the invention.

FIG. 1 shows an identification card 1 with an inventively contoured relief structure 3 and further prints 5 and images 7.

The identification card 1 has at least one card surface of plastic, in which one or several tactile symbols are formed. Symbol therein means both alphanumeric characters and graphic shapes and patterns in general. The tactility of the symbols is achieved by forming a relief structure. For this purpose the symbols are each divided into a central area and an edge area. In the central area the relief structure is formed. It consists of foamed plastic and has the inherent color of the plastic material or has at most a minor discoloration in comparison to the inherent color. The edge area is planar to the card surface and is implemented with a clear discoloration in comparison to the inherent color of the plastic material, so that the relief structure is contoured.

Figure 2:
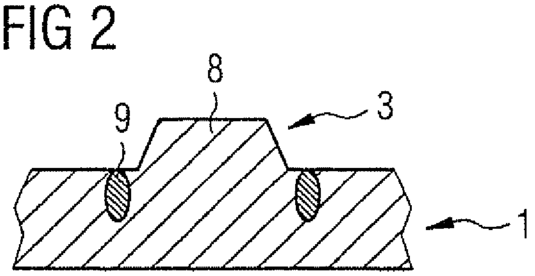
FIG. 2 a schematic sectional view of a contoured relief structure.

In FIG. 2 a contoured relief structure 3 is shown in a sectional view. Next to the foamed relief structure 8 forming the central area of a symbol there are discolored areas which are situated in the edge area of the symbol and form a contour 9 around the foamed relief structure 8. To produce the foamed relief structure 8 the laser is guided along a first path, tracing the central areas of the symbols. To produce the contour 9 the laser is guided along a second path, which is derived from the first. The order of producing the foamed relief structure 8 and the contour 9 can be chosen at will.

The represented relief structure 3 was produced experimentally by means of a laser of the brand FOBA DP20GS, firstly on an identification card 1 consisting of PETG, wherein the laser was operated with a diode current of 28 A and a frequency of 55 kHz. To produce the foamed relief structure 8 the laser was moved at a path speed of 7000 mm/s along the lines of a grid formed of three lines intersecting at 45° or 90°; the line spacing was 0.07 mm. To produce the discolored contour 9 a dot density of 465 dpi was preset.

Figure 3A:
FIGS. 3*a, b* a comparison of a conventional relief structure with an inventively implemented relief structure.

Secondly, by means of the same laser the relief structure 3 was produced on an identification card 1 with a PVC core, onto which a cover layer of a mixture of PET with PC had been applied. In this card the foamed relief structure 8 and the discolored contour 9 were both produced in raster-mode operation. Therein the laser was operated at a diode current of 26 A and a frequency of 55 kHz. To produce the foamed relief structure 8 a dot density of 500 dpi was preset, to produce the discolored contour 9 a dot density of 465 dpi. The contoured relief structure 3 is enlarged in FIG. 3*b*. In comparison to a conventional relief structure (FIG. 3*a*) the inventive contoured relief structure 3 is clearly more easily visually perceivable.

The path control of a laser usable for producing the discolored contours 9 represents a special challenge in the inventive production method. In particular it is impossible to simply repeat the path followed for the production of the foamed relief structure 8. In order to achieve a path control suitable for producing the contour 9 four exemplary solutions are proposed:

(a) A sample card with a foamed relief structure 8 is produced and is subsequently geometrically measured. The path control data for the contour 9 are generated on the basis of the measured values. The method yields very good results, but it is elaborate.

(b) On the basis of the path control data for producing the relief structure 8 path control data for producing the contour 9 are generated arithmetically, for example by adding a value taking account of the respective width of the foamed relief structure 8 to the given control data. To achieve good visual results the method requires highly complex algorithms and is consequently preferably suitable if a contoured relief structure 3 is to be produced, which consists of a small number of uncomplicated symbols.

Figure 4:
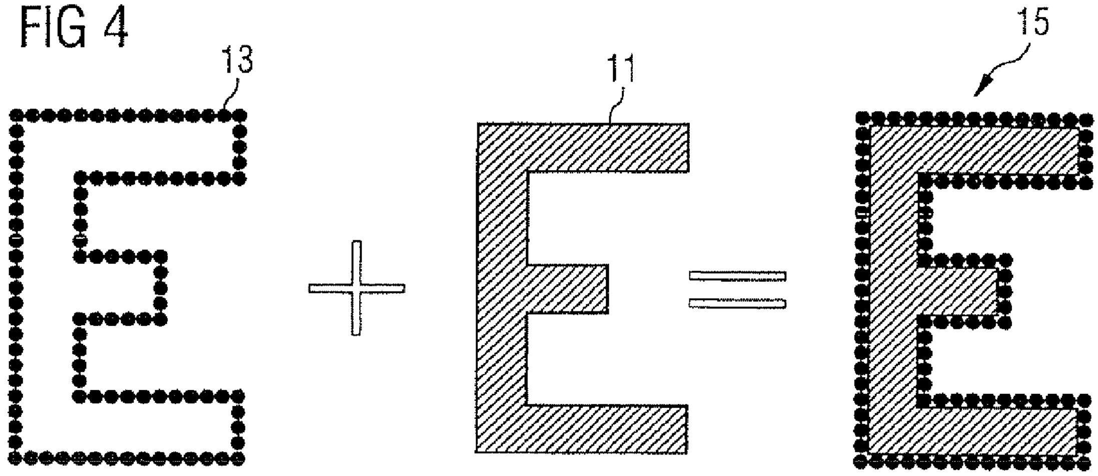
FIG. 4 schematically a basic principle of the inventive method, in which a foamed relief area is surrounded by a discolored contour area.

FIG. 4 shows an area to be foamed 11, within which a laser beam is moved long a path. The properties of the laser beam are chosen in such a fashion that energy is applied to a card surface material in such a way that it forms a foamed relief structure. On the basis of the dimensions of the area to be foamed 11 control data for producing a contour line 13 are calculated. Subsequently the laser's properties are adapted in such a fashion that it applies energy to the card surface material in such a way that it is blackened. The laser beam is guided along the calculated contour lines. The result is a relief structure 15 with a black contour.

(c) If the card surface consists of a plastic material which, once foamed by laser application, cannot be discolored any more, the width of a laser beam causing a discoloration is chosen to be wider than the width of a laser beam used for producing the foamed relief structure. In this case the path used for the production of the foamed relief structure 8 can simply be followed. The edge areas of the symbols exceeding the foamed relief structure 8 are then discolored in the form of a contour, so that the contour 9 is created, whereas the foamed relief structure 8 itself cannot be discolored or can be discolored at most lightly.

Figure 5:
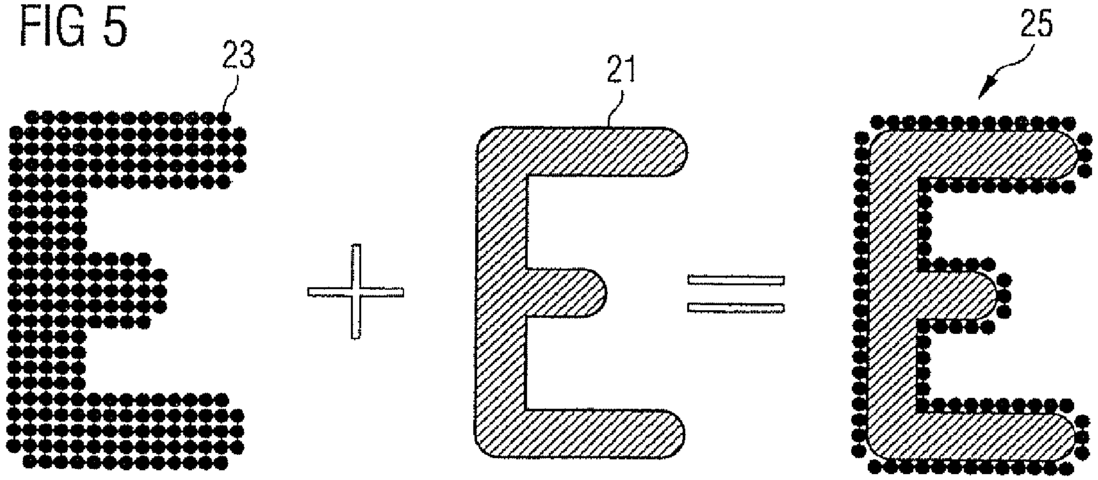
FIG. 5 schematically an alternative basic principle of the inventive method, in which a contour area covering a greater surface is superposed in an overlapping fashion on a foamed relief area covering a smaller surface.

FIG. 5 shows an example of a superposition of a relief structure 21 by a larger-surface contouring structure 23. Both structures are implemented in a single-line character set. The result is the relief character 25 surrounded by a contour-like outline.

(d) To produce the contour the path used for producing the foamed relief structure 8 is repeated several times, wherein the path is offset from the path originally used for producing the foamed relief structure 8 by a certain value on the occasion of each repetition. The offset preferably takes place in the main directions allocated to the symbols, typically in +x, −x, +y, −y direction.

Figure 3B:
Figure 6:
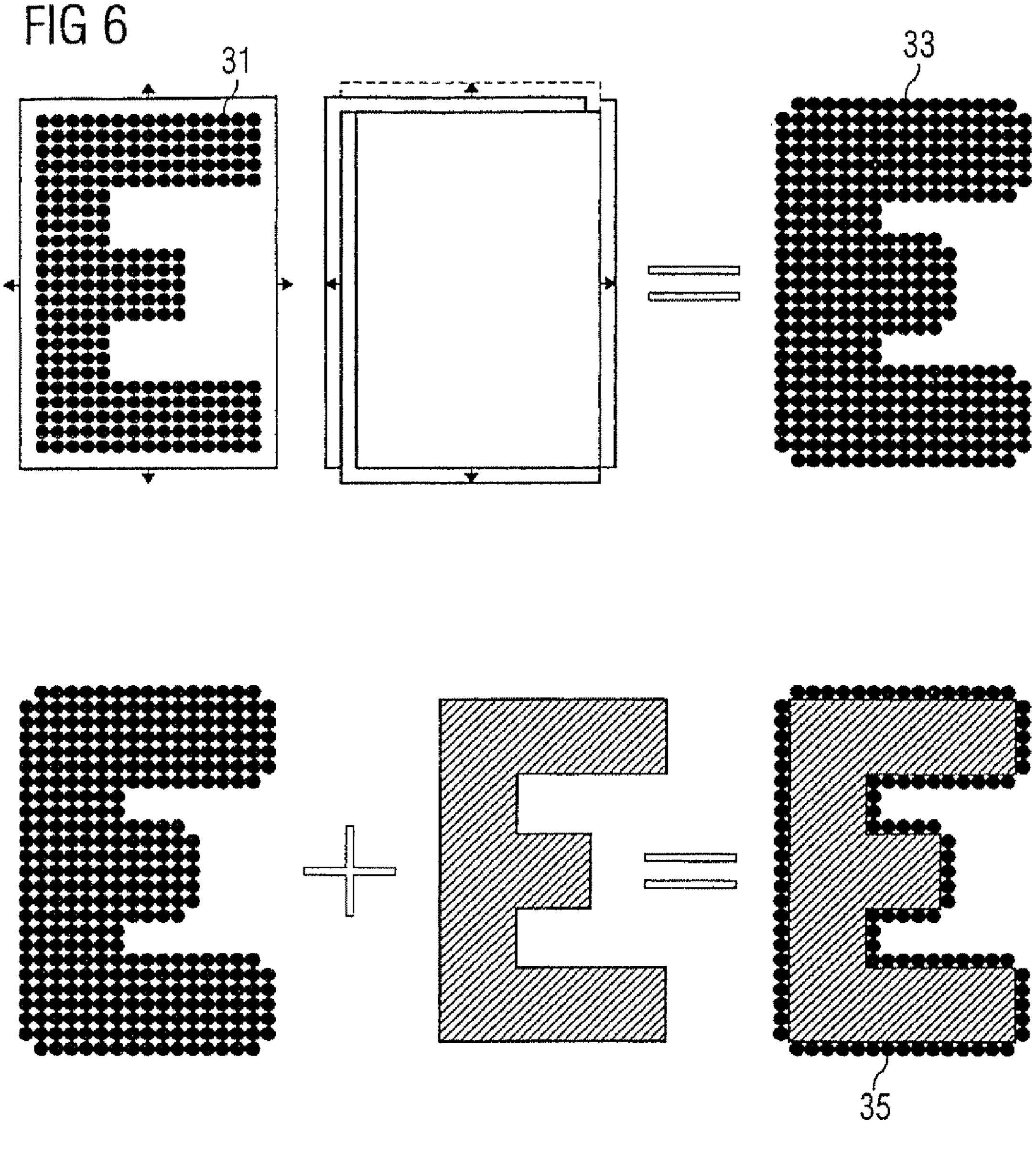
FIG. 6 schematically a basic principle of a further embodiment of the inventive method.

FIG. 6 shows an example in which a broader, "bolder" character 33 is produced on the basis of a first pattern 31 by offsetting the pattern as used for producing the relief structure. This bolder character 33 is used for producing path data for controlling the laser during the blackening and is superposed on the foamed relief structure 8. The result is a relief character 35 with a black contour. By determining a suitable offset, for example by leaving out a main direction, a similar shadow effect can be achieved as shown in FIG. 3*b*.

While maintaining the basic approach of producing a contoured relief structure 3 on a plastic identification card by producing in one step a foamed relief structure 8 and in a further step a surrounding, discolored contour 9 by means of a laser beam applied in two different energy modes, the inventive solution allows a number of further variations. Thus also further plastic materials that can be foamed and discolored are eligible in addition to those explicitly mentioned. Furthermore, the specified processing parameters can be varied in order to achieve for example relief structures 8 foamed to a greater thickness or a greater processing speed. The parameters are among other things of course also dependent on the laser used in the concrete case and the purpose of the contoured relief structure 3. The inventive solution is furthermore not limited to identification cards, but is analogously suitable also for plastic cards with different function and of any desired format, such as phone cards, admission tickets or gift cards.

The invention claimed is:

1. An identification card, comprising:

at least one card surface of plastic, the surface plastic having a first color; and at least one tactile symbol with a relief structure, wherein the at least one symbol has a central area and an edge area, the relief structure is formed in the central area of the symbol and includes a foamed plastic material having the first color of the plastic material, and the edge area outlines the central area and at least partly has a discoloration having a color different from the first color of the plastic adjoining the relief structure, so that the relief structure is at least partly outlined by a contour of discolored plastic of the edge area.

2. The identification card according to claim 1, wherein the relief structure is completely surrounded by the contour.

3. The identification card according to claim 1, wherein the contour has a uniform width.

4. The identification card according to claim 1, wherein the foamed plastic of the relief structure and the discolored plastic of the contour comprise the same plastic material.

5. The identification card according to claim 4, wherein the plastic material comprises PVC or polyester.

6. The identification card according to claim 4, wherein the plastic material comprises polycarbonate or a mixture of polycarbonate with PVC or polyester.

7. A method for producing at least one symbol on an identification card having a surface of a plastic material with a first color that has the property that upon the application of energy in a first energy application mode increases its volume by foaming, and upon the application of energy in a second energy application mode changes its color, comprising the steps:

producing a foamed relief structure on the identification card by applying energy to the plastic material on the central area of the at least one symbol by means of a laser in the first energy application mode causing the plastic material to increase its volume by foaming, wherein the laser is moved along a first path across the central area of the symbol, the foamed relief structure having the first color of the plastic material; and producing discolored contours having a color different from the first color of the plastic material in the edge area of the symbol outlining the foamed areas by applying energy to the plastic material by means of a laser in the second energy application mode causing the plastic material to discolor, wherein the laser is guided along a path that was derived from the first path.

8. The method according to claim 7, wherein when the foamed relief structure is produced and when the discolored contours are produced the energy is applied respectively through irradiation with a laser beam.

9. The method according to claim 8, wherein the laser beam is controlled in a raster mode, wherein the energy application takes place point by point.

10. The method according to claim 8, wherein in the step of producing discolored contours the central areas are not irradiated by the laser beam.

11. The method according to claim 8, wherein a dot density of the laser beam in the step of producing the foamed relief structure is increased in comparison to a dot density for producing the discolored contour.

12. The method according to claim 8, wherein the laser beam is controlled in vector mode in the step of producing the foamed relief structure.

13. The method according to claim 8, wherein the step of producing the discolored contour and the step of producing the foamed relief structure are carried out by means of the same laser beam.

14. The method according to claim 8, wherein the plastic material comprises PVC or polyester.

* * * * *